T. Boyd.
Tent.

No. 3,565. Reissued Jul. 27, 1869.

Witnesses.
S. W. Brown.
Indiana Sayre.

Inventor.
Thomas Boyd

N. PETERS, PHOTO-LITHOGRAPHER, WASHINGTON, D. C.

United States Patent Office.

THOMAS BOYD, OF BOSTON, MASSACHUSETTS.

*Letters Patent No.* 33,068, *dated August* 20, 1861; *reissue No.* 3,565, *dated July* 27, 1869.

IMPROVED VENTILATING-CAP FOR TENTS.

The Schedule referred to in these Letters Patent and making part of the same.

*To all whom it may concern:*

Be it known that I, THOMAS BOYD, of Boston, in the county of Suffolk, and State of Massachusetts, have invented a new and useful Improvement in Tents; and I do hereby declare that the following is a full, clear, and exact description thereof, reference being had to the annexed drawings, making part of this specification, in which the figures represent my improvement.

Corresponding letters refer to corresponding parts in the several figures.

Figure 2:
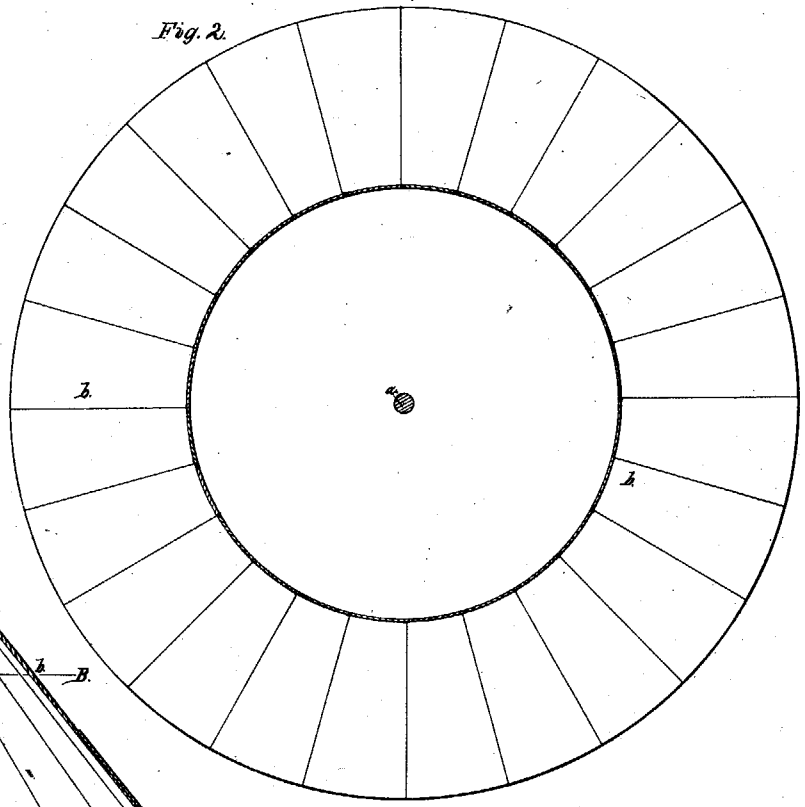
Figure 2 is a horizontal section, taken in line A B, fig. 1.
Figure 3:
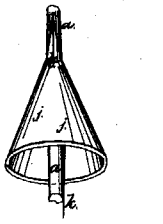
Figure 3 is a detailed view of the cap or covering.

It has always been very desirable, in the manufacture of tents and other similar devices, to provide some suitable means for the ventilation of, and the production of currents of fresh air through the same. If tents have no way provided for their ventilation, the enclosed air soon becomes foul and unwholesome, and especially is this the case when they are pitched in hot and sultry climates.

The upper portion of the tent-canvas, around the tent-pole thereof, has sometimes been so arranged as to allow the exit of smoke, &c.; but this would only take place during pleasant weather, as the communication with the external air was obliged to be cut off during rainy or other stormy weather, in order to prevent rain, &c., from entering.

This, it is evident, is a serious disadvantage, and therefore the object aimed at and secured by the present invention, is to provide some suitable means for the ventilation of tents, in wet as well as in dry, in stormy as well as in pleasant weather.

I accomplish the above-described result by attaching to the centre-poles of the tent, in such a manner as to permit of its being raised or lowered at pleasure, a cap or covering, made of a conical shape, which covers and protects, as it were, an annular open space in the top of the tent around the poles, so as to exclude the entrance of rain through the same, while allowing free ventilation, the draught of air through the tent being regulated at pleasure by the raising or lowering of the cap.

*a a*, in the drawings, represent the centre-poles of the tent.

*b b*, the canvas, or any suitable water-proof material of which the tent may be made.

*c c*, &c., *d d*, &c., are pins and ropes which secure the canvas *b* to the ground in the usual manner.

The upper portion of the tent-canvas *b* is arranged so as to leave an open annular space, *e*, around the poles *a*.

To the ring *f* of the top portion of the canvas *b*, are secured chains or cords *g g*, &c., the other ends of which are attached to another ring, *h*, around the poles *a*.

*i* is a rope attached to the ring *h*, which, passing up over a suitable pulley in the poles *a*, allows of the tent-canvas *b* being so raised or lowered as to tighten or loosen it, as may be desired.

*j* is a cap or covering, made of a conical shape, the upper end of which is attached to the poles *a* of the tent, over the opening *e*, in such a manner, that by means of a rope, *k*, playing over pulley *l*, it (the cap) can be moved up and down, and secured at any desired position upon the same.

Figure 1:
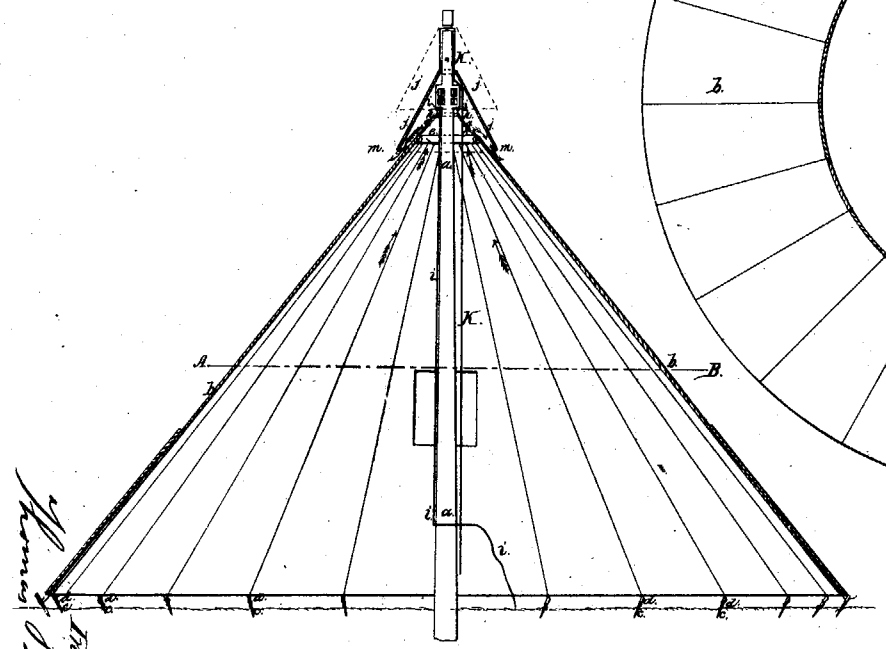
Figure 1 is a central vertical section.

This cap or covering *j*, by being raised to its highest position, represented by dotted lines in fig. 1, allows of free ventilation of the tent through the open space *e*; and when it is lowered, in order to exclude rain, &c., and prevent it from entering through the opening *e*, as represented in section in fig. 1, ventilation is still permitted through the space *m*, left between the interior surface of the cap *j* and the exterior of the tent-canvas *b*, the diameter of the plane of the cap's base being considerably larger than that of the tent-canvas at the same plane.

A metallic ring is placed in the cap, which causes it to lower, when the sustaining-rope *h* is loosened by its weight, the cap *j* being made of any suitable material.

Thus it will be seen that by forming an open space around the poles of the tent, or in the upper part of the structure, and placing over the same the cap *j*, constructed as above described, the tent can be as thoroughly ventilated in wet as in dry, in stormy as in pleasant weather; for during rainy and other stormy weather, the cap, being lowered, closes up, as it were, the opening *e*, around the poles *a*, to the entrance of rain, &c., but yet allows communication between the interior of the tent and the external air, a result which has never before been accomplished.

It will be evident, that instead of having an open space around the pole of the tent, a suitable number of apertures may be provided in the canvas, and also that the cap may vary in form from the one herein described.

Having thus described my improvements, I shall state my claims as follows:

What I claim as my invention, and desire to have secured to me by Letters Patent, is—

1. A cap or covering, so arranged as to be susceptible of motion in a vertical or up-and-down direction, and so operating that the tent can be ventilated in both stormy and pleasant weather, substantially as herein set forth.

2. A conical ventilating-cap, the apex of which is an acute angle, substantially as shown, when so arranged, with reference to the orifice or orifices through which the upward current of air passes, that said orifice or orifices shall be within the cap, or above the lower edge thereof, substantially as and for the purpose specified.

In testimony whereof, I have signed my name to this specification, before two subscribing witnesses.

Witnesses: THOMAS BOYD.

CHAS. H. BACALL,

ALFRED L. BARBOUR.